United States Patent Office 2,880,132
Patented Mar. 31, 1959

2,880,132

RODENTICIDAL COMPOSITIONS COMPRISING A 2-ACYL 1,3-INDANDIONE AND AN ETHYLENE-DIAMINE TETRAACETATE

Morton Schwarcz, Highland Park, Ill., assignor, by mesne assignments, to Morton Chemical Company, Chicago, Ill., a corporation of Delaware No Drawing. Application February 11, 1953
Serial No. 336,440

10 Claims. (Cl. 167—46)

This invention relates to improved rodenticidal compositions.

The great economic waste occasioned by the depredations of various rodents is well known. Also, in addition to causing injury, destruction and/or contamination of valuable property and goods, some species of rodents are the usual hosts of vectors of certain human diseases such as bubonic plague, rickettsialpox and, perhaps, murine typhus. Accordingly, much effort has been expended in the development of methods and means for the destruction of rodent populations and for preventing or at least ameliorating the damage resulting from their depredations.

The destruction of rodent populations is extremely difficult. Some species of rodents, the rat for example, possess a highly developed native intelligence. Although a voracious feeder, the rat is suspicious of foreign odors and tastes and will reject a poisoned bait unless the presence of poison is undetectable by taste or smell. In attempting to destroy rats by presentation of a bait containing a rapid and direct acting but tasteless and odorless poison, a rat ingesting a sublethal dose of the poisoned bait can be marked down as a survivor of the attempt at destruction for such a rat will not ingest a second portion of the poisoned bait. For this reason, it is common practice to employ a plurality of poisons in attempts to destroy rat colonies, the several poisons being individually presented to the rats (as poisoned baits) at rather widely separated time intervals. By this procedure, rats ingesting a sublethal quantity of the first poisoned bait gradually lose the bait shyness thereby developed and may accept a lethal dose of bait containing the second poison when this is subsequently presented. Also, any rats rejecting the first poisoned bait because of individual taste and odor idiosyncrasies or for other reasons may accept the bait containing the second poison. While this double poison procedure is in general considerably more effective than procedures employing a single poison, it is rather troublesome to carry out and is far from perfect due to another manifestation of rat native intelligence. As mentioned previously, some rats are capable of attributing symptoms of poisoning to bait that he is ingesting and will cease consumption of such bait, frequently before a fatal dose has been taken. Furthermore, there is no doubt that some healthy rats are capable of attributing symptoms of poisoning in other rats to the bait they have been ingesting and will accordingly avoid such bait. For these reasons, even the use of a plurality of active poisons will result in considerable population survival and the employment of but one active poison will result in an appreciably greater percentage of survivors.

Because of the above mentioned and other deficiencies of rapid and direct acting poisons as rodenticides, in recent years increasing attention has been devoted to the use of comparatively slow acting tasteless and odorless indirect poisons that do not produce any symptoms of poisoning, at least for a considerable period of time. Such materials can be freely ingested by rodents over a comparatively long period of time without producing untoward symptoms in the individual rodent or observable symptoms in his colony companions. As a result, when the more susceptible members of the colony first exhibit symptoms of poisoning all members or practically all members of the colony have already ingested a lethal dose of the indirect poison. These indirect poisons are not poisons in the usual sense of the term but are rather blood anticoagulants. Rodents ingesting such materials continue to gain weight and exhibit no untoward symptoms until just prior to death which occurs in about one to three weeks and is caused by marked hemorrhages, usually of the pleural cavity and lungs, but also observed retroperitoneally and subcutaneously and in the caecum, thymus, eye and other organs.

These rodenticidal anticoagulants have other advantages in addition to those mentioned above. Most prior art rodenticides are insoluble in water and accordingly must be presented in the form of dry baits prepared by mixing the rodenticide with a rodent food or foods. In locations where natural or manufactured foodstuffs are available to rodents, for example, in barns, grain elevators, food processing plants and the like, the rodents will invariably accept the natural or manufactured foodstuffs in preference to the poisoned dry baits no matter how attractively the latter are prepared and presented. In such an environment, the probability of a rodent ingesting a poisoned dry bait is no greater and is usually considerably less than the ratio of said bait to the other food available to the rodent. However, rodents do require water, especially when feeding, and it is much easier to eliminate rodent available water supplies in barns, grain elevators, food processing plants and the like than it is to render unavailable the supplies of natural or manufactured foods in such structures. The alkali metal salts of rodenticidal anticoagulants are water soluble and accordingly it is possible to prepare rodenticidal water baits containing these compounds and when presented in this manner the rodent will ingest such water baits during feeding. Also, rodenticidal water baits are much more effective than dry baits, due probably to more rapid absorption of the rodenticide in solution. As will be set forth subsequently, a 0.005% solution of the rodenticidal anticoagulants with which this invention is concerned is a highly effective water bait but about 0.025% of the compounds must be employed in dry baits to secure equal effectiveness.

Several rodenticidal anticoagulants have been proposed and used to a greater or lesser extent. One class of such materials embraces the 2-actyl 1,3-indandiones. This class of compounds exhibits many advantages in comparison with hitherto known rodenticidal anticoagulants. For example, the 2-acyl 1,3-indandiones and the alkali metal salts thereof have mold growth inhibiting and fungicidal properties while some other rodenticidal anticoagulants promote the growth of molds and fungi and are consumed during the growth of such organisms. Also, the alkali metal salts of 2-acyl 1,3-indandiones are stable in aqueous solution while the same salts of certain other rodenticidal anticoagulants are destroyed in a short time (5–10 hours) following solution in water.

The alkaline earth salts (and the heavy metal salts) of 2-acyl 1,3-indandiones (and of rodenticidal anticoagulants of other types) are practically insoluble in water. As a result, when a solution of an alkali metal salt of a 2-acyl 1,3-indandione is prepared using hard water, the calcium, magnesium and similar ions giving rise to the hardness replace the alkali metal ions of the organic compound, forming practically insoluble salts thereof. Since very dilute solutions of the alkali metal salts are employed as rodenticides and, more frequently than not, hard water is employed in the preparation of such solutions, partial or even complete precipitation of the rodenticidal compound as the alkaline earth salt thereof commonly occurs and as a result the effectiveness of the solution as a rodenticide is decidedly diminished or even completely destroyed. This invention is directed, inter alia, to the elimination of this disadvantage as exhibited by the alkali metal salts of 2-acyl 1,3-indandiones.

One object of this invention is to provide an improved composition of matter comprising an alkali metal salt of a 2-acyl 1,3-indandione.

Another object of this invention is to provide a composition of matter comprising an alkali metal salt of a 2-acyl 1,3-indandione that does not form a precipitate on solution in hard water.

A further object of this invention is to provide a composition of matter comprising an alkali metal salt of a 2-acyl 1-,3-indandione exhibiting a greater degree of rodent acceptance than the alkali metal salt of the 2-acyl 1,3-indandione alone.

Other objects of this invention will become apparent as the description thereof proceeds.

A host of 2-acyl 1,3-indandiones are known in the art and such materials may be prepared, for example, by the Claisen condensation of a phthalate ester, such as ethyl phthalate, and a methyl ketone, as set forth in an article by Kilgore, Ford and Wolfe, Ind. Eng. Chem., 34, 494–497, 1942. Thus, by the Claisen condensation of diethyl phthalate with acetone, methyl ethyl ketone, methyl propyl ketone, methyl butyl ketone, methyl amyl ketone, methyl hexyl ketone and the like there is formed, respectively, the 2-acetyl, 2-propionyl, 2-butyryl, 2-valeryl, 2-caproyl and 2-enanthyol 1,3-indandiones, and the like. Methyl ketones such as methyl isopropyl ketone, methyl isobutyl ketone, methyl t-butyl ketone (pinacolone) and the like give rise, respectively, to 2-isobutyryl, 2-isovaleryl and 2-pivalyl 1,3-indandiones, and the like. Methyl aromatic ketones, methyl alicyclic ketones and methyl heterocyclic ketones react similarly. Claisen condensation of diethyl phthalate with acetophenone produces 2-benzoyl 1,3-indandione; with methyl alpha (or beta) naphthyl ketone, 2-alpha (or beta) naphthoyl 1,3-indandione forms while 2-hexahydrobenzoyl 1,3-indandione is obtained using methyl cyclohexyl ketone.

While the 2-acyl 1,3-indandiones are here formulated as keto derivatives, this is for convenience only, as there is no doubt that they exist, in part at least, in the enol form. The infra red spectra of these materials show carbonyl bonds displaced to longer wave lengths than normal and there is a general absorption in the region of 3.3 mu on both sides of the C–H band, both indicative of hydrogen bonded enols. The ultraviolet absorption of 2-isovaleryl 1,3-indandione (for example) shows a series of high intensity bands at 323, 283, 274 and 237 m. mu, again indicating that this substance exists in enol form. Obviously, the salts of this class of compounds are salts of the enol form.

Rodenticidal water baits containing alkali metal salts of 2-acyl 1,3-indandiones may be prepared by dissolving the appropriate quantity of the alkali metal salt in water or by adding the proper quantity of a 2-acyl 1,3-indandione to water containing the stoichiometric amount of alkali metal hydroxide or carbonate.

The following illustrative but non-limiting examples describe suitable procedures for the preparation of alkali metal salts of 2-acyl 1,3-indandiones.

Example 1

Forty grams (one mole) sodium hydroxide were dissolved in 500 ml. methanol. One mole (230 g.) 2-pivalyl 1,3-indandione were dissolved in the resulting solution following which it was concentrated to half its initial volume. Diethyl ether (2200 ml.) were added to the cooled concentrate which was stirred and further cooled to 0° C. The separated solid was removed by filtration and placed in an oven at 105° C. Over a period of five hours the originally gummy precipitate slowly changed to a free-flowing, bright yellow crystalline product. Yield, 207 g. (80% theory). M.P. 205–210° C.

Analysis.—Calc. for $C_{14}H_{13}O_3Na$: C, 66.68%; H, 5.18%. Found: C, 67.32%; H, 5.26%.

Example 2

If isolation of the sodium salt is not necessary one may add 230 g. (one mole) 2-pivalyl 1,3-indandione to a solution of 40 g. (one mole) sodium hydroxide in 2000 ml. ethanol. The resulting mixture is stirred and heated to about 50° C. when complete solution is obtained. The resulting solution contains approximately 126 g. per liter of the sodium salt of 2-pivalyl 1,3-indandione.

Example 3

Similar to Example 2 except that 2000 ml. water was used instead of the same volume of ethanol.

Example 4

The stoichiometrically equivalent amount of 2-isovaleryl 1,3-indandione was added to a hot normal solution of sodium carbonate. On strong cooling of the resulting solution, the sodium salt was obtained as long bright yellow needles which, after recrystallization from water, sintered at 200° C. and melted at 215° C. 2-isovaleryl 1,3-indandione sodium salt, prepared as here described, contains one molecule of water of crystallization which is held with extreme tenacity.

The alkali metal salts of other 2-acyl 1,3-indandiones may be prepared by methods similar to those outlined in the preceding examples or by other suitable methods obvious to those skilled in the art. While the preparation of the sodium salts is described, obviously, if desired, the potassium salts may be made by analogous procedures.

An aqueous solution containing in the neighborhood of 0.005% by weight (0.05 mg./ml.) of a 2-acyl 1,3-indandione is an excellent rodenticidal water bait. Such a solution is produced, for example, by dissolving 0.055 g. of the sodium salt of 2-pivalyl 1,3-indandione in one liter of water or by diluting a concentrated solution of the salt (prepared, for example, as set forth in Examples 2 and 3) with the appropriate amount of water. However, as has been set forth previously, if hard water is employed in producing the water bait, the bait soon loses its effectiveness. Thus, on forming a 0.005% solution of 2-pivalyl 1,3-indandione (as the sodium salt) in a northern Illinois well water containing 262.4 p.p.m. total solids and exhibiting a high degree of temporary hardness, the resulting solution became turbid almost immediately and deposited a precipitate after several hours. The ultraviolet absorption of the precipitate gave peaks (e.g. at 283 m. mu) characteristic of a 2-acyl 1,3-indandione. A 0.0055% solution of 2-pivalyl 1,3-indandione sodium salt contains 55 p.p.m. solids, stoichiometrically equivalent to only 11 p.p.m. hardness calculated as calcium carbonate. Accordingly, in the preparation of water baits of conventional strength, the vast majority of available waters contain more than sufficient alkaline earth ions to precipitate all of the rodenticidal compound used.

Water baits made using distilled water, rain water, deionized water, zeolite softened water (but not alum softened water) are stable but waters of these types possess a foreign taste as far as rodents are concerned and accordingly such water baits are less acceptable than baits made with water with which the rodent is familiar. Also, obviously, waters of these types are usually not conveniently available.

I have discovered that if an alkali metal salt of ethylenediamine tetraacetic acid, such as a di-, tri- or tetra-sodium or potassium salt of said acid is added to hard water, a stable rodenticidal water bait can be prepared by incorporation of an appropriate quantity of an alkali metal salt of 2-acyl 1,3-indandione therein. This discovery is not too surprising in view of the well known sequestering action of such materials (known commercially as Versenes, Sequestrenes, Nervanaids, et cetera) with respect to ions concerned in the production of hardness. However, I have discovered the entirely new and unexpected result that rodenticidal water baits containing an alkali metal salt of a 2-acyl 1,3-indandione and such a sequestering agent are much more acceptable to rodents than water baits prepared in the absence of such a sequestering agent.

*Example 5*

Ten albino rats were placed in a common cage. A normal food ration was freely available to the rats at all times as well as a supply of Denver city water and a separate supply of a 0.0055% solution of the sodium salt of 2-pivalyl 1,3-indandione in Denver city water. Over a period of ten days, 2715 ml. of the city water was consumed but only 1205 ml. of the rodenticidal water bait. Five of the rats were dead after ten days.

It will be noted that the rats in this example showed a decided preference for the city water in comparison with the rodenticidal water bait prepared with the same city water. Also, the mortality was not particularly high.

*Example 6*

The test procedure was similar to that described in Example 5 with the exception that the rodenticidal water bait was a 0.0055% solution of the sodium salt of 2-pivalyl 1,3-indandione in Denver city water containing one gram per quart Versene. Over a period of twelve days the rats consumed 1720 ml. city water and 1810 ml. of the rodenticidal water bait. Eight rats were dead after twelve days.

The city water and the Versene containing rodenticidal water bait were equally acceptable to the rats. Rat mortality was high.

*Example 7*

The test procedure of Example 6 was followed with the exception that Denver city water was not available to the rats. During a period of ten days the rats consumed 2415 ml. of the Versene containing rodenticidal water bait. All rats were dead after ten days.

As is well known, rats prefer tap water to aqueous solutions of the sodium salt of 3-(1-phenyl 2-acetylethyl) 4-hydroxycoumarin (Warfacide) unless the solution of the salt is extremely dilute. (Warfacide is a rodenticidal anticoagulant.) Thus, Crabtree (Soap and Sanitary Chemicals, February 1950), states; in connection with experiments conducted essentially as described in Example 5, "at a concentration above .02 mg./ml. considerably more fresh water was taken than the Compound No. 42 solutions, whereas at the .02 mg./ml. level about equal quantities were consumed." (The Compound No. 42 solutions of this quotation were solutions of Warfacide in water, presumably Denver city water. A concentration of 0.02 mg./ml. is equivalent to a 0.0002% solution.) To determine whether the acceptability of solutions of Warfacide was increased by the presence of Versene, the following test was run.

*Example 8*

Ten albino rats were placed in a common cage. A normal food ration was freely available to the rats at all times as well as a supply of Denver city water and a separate supply of a 0.005% solution (0.05 mg./ml.) of 3-(1-phenyl 2-acetyl ethyl) 4-hydroxycoumarin (as the sodium salt) in Denver city water containing one gram per quart of Versene. Over a period of twelve days the rats consumed 2900 ml. Denver city water and only 1010 ml. of the Versene containing water bait. At the end of twelve days four rats were dead.

It will be noted that, contrary to the results obtained with water baits containing the sodium salt of 2-pivalyl 1,3-indandione, the acceptability of water baits containing Warfacide is not increased by the presence of Versene, the rats preferring straight Denver city water by a ratio of almost 3:1. Also, rat mortality was low in this experiment.

It is evident from the results presented that the new and unexpected acceptability promoting effect of Versene is very specific. Rats preferentially consume water when water and a 0.0055% aqueous solution of the sodium salt of 2-pivalyl 1,3-indandione are both available. However, if the rodenticidal solution also contains Versene, the rats consume water and the Versene containing rodenticidal solution in approximately equal amounts. Rats also preferentially consume water when water and a 0.005% aqueous solution of 3-(1-phenyl 2-acetyl ethyl) 4-hydroxycoumarin (as the sodium salt) are both available but, contrary to the results observed with Versene containing solutions of the sodium salt of 2-pivalyl 1,3-indandione, the rats still exhibit a very marked preference for straight water when the choice lies between water and a Versene containing solution of Warfacide.

While my invention has been specifically described in connection with the sodium salt of 2-pivalyl 1,3-indandione, this is for purposes of convenience in exposition only and the invention is not limited thereto. The alkali metal salts of 2-acyl 1,3-indandiones are all active rodenticides and any one of these may be employed for accomplishing the objects of my invention. Highly accurate data on biological responses are difficult to obtain, requiring large numbers of experiments with many replications and even so the results are best expressed in connection with the probable error involved. While alkali metal salts of 2-acyl 1,3-indandiones are, as a class, highly active rodenticides, there are differences in activity among various members of this class of compounds. Bearing in mind the above mentioned difficulties in assessing minor variations in biological responses, it appears that 2-pivalyl 1,3-indandione sodium salt is the most active member of the group. The 2-isovaleryl and 2-naphthoyl derivatives appear to be but slightly less active than the 2-pivalyl derivative. The 2-propionyl, 2-caproyl, 2-enanthoyl and 2-cyclopropyl carbonyl and the many other derivatives tested are all highly active but apparently are not quite as effective as derivatives previously named.

It may be mentioned in passing that the alkali metal salts of 2-acyl 1,3-indandiones, in addition to being highly effective rodenticides, have a powerful corollary insecticidal action against blood sucking parasites with rodent hosts. Soon after a rodent ingests an alkali metal salt of a 2-acyl 1,3-indandione, the blood of the rodent becomes highly toxic to blood sucking parasites of the rodent and as a result these parasites die soon after taking a blood meal from the poisoned host. Ingestion of an alkali metal salt of a 2-acyl 1,3-indandione by the rodent results in a marked decrease or even complete disappearance of the blood prothrombin and when such prothrombin deficient blood is taken by the blood sucking parasite it apparently diffuses through the gut wall into the hemolymphatic system of the parasite causing death. This is an interesting and most important effect. As previously mentioned, certain blood sucking parasites of rodents are vectors of some extremely serious human diseases. The alkali metal salts of 2-acyl 1,3-indandiones are slow acting rodenticides yet the rodent hypoprothrombinemia appearing soon after their ingestion is rapidly fatal to blood sucking parasites which may be vectors of bubonic plague, rickettsialpox and the like. Accordingly, while rodent destruction is comparatively slow, the elimination of potential threats to human welfare is almost instantaneous. Also, any rodents that, through a combination of circumstances, ingest only a single dose or a nonlethal dose of an alkali metal salt of a 2-acyl 1,3-indandione, nevertheless become fatal hosts to such parasites and remain so for a considerable period of time.

The amount of Versene to employ in compositions prepared in accordance with my invention depends in some measure upon the hardness of the water used in making the rodenticidal water baits. In Example 6, the rodenticidal water bait contained one gram Versene per quart. One gram Versene chelates a quantity of calcium ion equivalent to 201 mg. calcium carbonate. This amount of calcium carbonate per quart is equivalent to about 212 p.p.m. calcium carbonate. Rarely indeed do potable waters have a hardness greater than that equivalent to 212 p.p.m. calcium carbonate and accordingly the use of one gram Versene per quart of the rodenticidal water bait is sufficient. However, if necessary, even greater amounts of Versene may be used in instances where unusually hard water must be employed to make the bait. If a soft water, a deionized water or a zeolite softened water is employed to prepare the bait no Versene is required to insure solution stability but if it is omitted the important enhancement in bait acceptability resulting from the use of Versene is of course lost. For this reason Versene should be employed to the extent of about one gram per quart when using pure and soft water to prepare the rodenticidal water bait.

The improved rodenticidal water baits of my invention may be prepared by any convenient procedure. For example, the required amount of Versene and of the sodium salt of the selected 2-acyl 1,3-indandione may be weighed out and then dissolved in the appropriate amount of water or, the required amount of Versene, of the selected 2-acyl 1,3-indandione and of sodium hydroxide may be weighed out and dissolved in the appropriate amount of water. Obviously, these methods are rather inconvenient and cannot be used by most potential consumers in view of the extremely small amount of the sodium salt of 2-acyl 1,3-indandione and the extremely small amount of sodium hydroxide and 2-acyl 1,3-indandione that must be weighed to produce even a relatively large volume of rodenticidal water bait. More conveniently, a blend of the rodenticide and Versene is prepared together with, if desired, an innocuous, preferably water soluble inert, and the blend is packaged or tableted for marketing, each package or tablet containing sufficient material to produce the improved rodenticidal water bait of my invention when dissolved in a convenient volume, say one quart of water. Or, if desired, the improved rodenticidal water bait itself may be prepared and marketed but this has many disadvantages. The bait is so dilute that packaging and transportation costs are high, inordinate amounts of warehouse space are required and the material must be protected from freezing. However, this scheme may be employed under certain circumstances, for example, in an intensive but somewhat localized eradication campaign. Here the rodenticidal water bait may be prepared in large volumes at a central depot and distributed from there to the many points of actual application. A more generally applicable procedure involves the preparation of a liquid concentrate a definite volume of which is added to a definite volume of water to produce the improved rodenticidal water bait of my invention as it is required. Thus a concentrate may be prepared containing 0.0107 g./ml. of the sodium salt of 2-pivalyl 1,3-indandione and 0.1920 g./ml. Versene (added as Versene solution, a solution containing 34% by weight of ethylenediamine tetraacetic acid tetrasodium salt). On adding one teaspoonful of this concentrate (approximately 4.9—5.0 ml.) to one quart of water, a 0.005% solution of the rodenticide results containing one gram Versene per quart.

Another very convenient method for preparing the improved rodenticidal water baits of my invention through us of dimensionally stable absorptive wafers containing the rodenticide and Versene in such amounts that the wafer, when leached with an appropriate volume of water, gives rise to the improved rodenticidal water bait of my invention. Thus, the upper surface of a Styrofoam (foamed polystyrene) wafer about ¼ to ⅜ inch thick is treated with a small volume (for example, 1–2 ml.) of an ethanolic solution of the sodium salt of 2-pivalyl 1,3-indandione, the quantity of the solution added to the wafer containing 0.052 g. of the salt, following which the wafer is dried (at a temperature below 80° C. to prevent warping, et cetera). About 3 ml. of 34% Versene solution (containing a wetting agent if desired) is then injected onto the wafer which is again dried as previously described. On adding the wafer to one quart of water, the salts absorbed by the wafer are removed by leaching to produce the improved rodenticidal water bait of my invention as an approximately 0.005% solution of the rodenticide containing about 1.28 g. Versene per quart.

In some instances, on adding the sodium salt of a 2-acyl 1,3-indandione and Versene simultaneously to hard water, turbidity and/or an off color develops at once. This is due to the fact that some alkaline earth salts of the rodenticide form and precipitate and/or highly colored soluble complexes of the rodenticide (e.g. the deep red iron complex) form before the Versene chelates the ions present. This causes no harm and any turbidity soon clears and any off color soon disappears. Due to the extreme stability of Versene complexes, the Versene is able to reconvert any precipitated alkaline earth salts of the rodenticide to the soluble sodium salt with accompanying formation of the practically un-ionized Versene-alkaline earth complex and is similarly capable of chelating the ions concerned in the formation of colored complexes of the rodenticide, thus restoring clarity and the typical yellowish color to the rodenticidal water bait.

While my invention has been described largely in connection with rodenticidal water baits containing in the neighborhood of 0.0055% by weight of the sodium salt of a 2-acyl 1,3-indandione, equivalent to approximately 0.005% by weight of the 2-acyl 1,3-indandione, the invention is not limited to any such concentration. Concentrations of rodenticide as low as 0.002% by weight or even less are effective and concentrations as high as 0.02% or higher may be used, such highly concentrated rodenticidal water baits being especially useful when, for any reason (migration, a rodent raid on a granary, et cetera), the rodent is apt to be in convenient proximity to a source of rodenticidal water bait for only a comparatively short period of time. The rodenticidal water baits, whether of high or low concentration, should contain about one gram Versene per quart but more of this material does no harm and may even be necessary if waters of excessively high hardness are employed.

Also, while my invention has been described exclusively in connection with the destruction of rats, the invention is not limited thereto. Rats are the most difficult rodents to destroy and accordingly were chosen to illustrate the effectiveness of the rodenticidal water baits of my invention. However, such rodenticidal water baits are highly effective against rodents in general such as mice, squirrels, rabbits, prairie dogs, and the like.

Be it remembered, that while this invention has been described in connection with specific details and specific examples thereof, there are illustrative only and are not to be considered limitations on the spirit or scope of said invention except in so far as these may be incorporated in the appended claims.

I claim:

1. The composition of matter comprising an alkali metal salt of ethylenediamine tetraacetic acid and an alkali metal salt of a 2-acyl 1,3-indandione.

2. The composition of matter comprising an alkali metal salt of ethylenediamine tetraacetic acid and from 2 to 20% by weight, based on said composition, of an alkali metal salt of a 2-acyl 1,3-indandione.

3. The composition of matter comprising an alkali metal salt of ethylenediamine tetraacetic acid and an alkali metal salt of 2-pivalyl 1,3-indandione.

4. The composition of matter comprising an alkali metal salt of ethylenediamine tetraacetic acid and from 2 to 20% by weight, based on said composition, of an alkali metal salt of 2-pivalyl 1,3-indandione.

5. The article of manufacture comprising an alkali metal salt of ethylenediamine tetraacetic acid and an alkali metal salt of a 2-acyl 1,3-indandione, characterized by the fact that addition of a unit quantity thereof to a predetermined quantity of water produces a solution containing 0.002 to 0.02% by weight of an alkali metal salt of the 2-acyl 1,3-indandione and approximately 0.1% by weight of said alkali metal salt of ethylenediamine tetraacetic acid.

6. The article of manufacture comprising an alkali metal salt of ethylenediamine tetraacetic acid and an alkali metal salt of 2-pivalyl 1,3-indandione characterized by the fact that the addition of unit quantity thereof to a predetermined quantity of water produces a solution containing 0.002 to 0.02% by weight of said alkali metal salt of 2-pivalyl 1,3-indandione and approximately 0.1% by weight of said alkali metal salt of ethylenediamine tetraacetic acid.

7. The article of manufacture comprising the sodium salt of ethylenediamine tetraacetic acid and the sodium salt of 2-pivalyl 1,3-indandione characterized by the fact that the addition of a unit quantity thereof to a predetermined quantity of water produces a solution containing approximately 0.0055% by weight of said sodium salt of 2-pivalyl 1,3-indandione and approximately one gram per quart of said sodium salt of ethylenediamine tetraacetic acid.

8. A rodenticidal water bait comprising an aqueous solution containing 0.002 to 0.02% by weight of an alkali metal salt of a 2-acyl 1,3-indandione and approximately one gram per quirt of an alkali metal salt of ethylenediamine tetraacetic acid.

9. A rodenticidal water bait comprising an aqueous solution containing 0.002 to 0.02 % by weight of an alkali metal salt of 2-pivalyl 1,3-indandione and approximately one gram per quart of an alkali metal salt of ethylenediamine tetraacetic acid.

10. A rodenticidal water bait comprising an aqueous solution containing approximately 0.0055% by weight of the sodium salt of 2-pivalyl 1,3-indandione and approximately one gram per quart of the sodium salt of ethylenediamine tetraacetic acid.

References Cited in the file of this patent
UNITED STATES PATENTS

Re. 23,080    Eck et al. _____ Jan. 25, 1949

FOREIGN PATENTS 522,646    Great Britain _____ June 24, 1940

OTHER REFERENCES

Crabtree: Soap and Sanitary Chemicals, pp. 131, 133, 135 and 147, February 1950.